(12) United States Patent
Bristiel et al.

(10) Patent No.: US 11,927,279 B2
(45) Date of Patent: Mar. 12, 2024

(54) DEVICE FOR COOLING HEAT-SENSITIVE CONTROL MEMBERS OF A PNEUMATIC OR ELECTROPNEUMATIC VALVE, AND VALVE EQUIPPED WITH SUCH A COOLING DEVICE

(71) Applicant: LIEBHERR-AEROSPACE TOULOUSE SAS, Toulouse (FR)

(72) Inventors: Frédéric Bristiel, Toulouse (FR); Stéphane Fauque, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 538 days.

(21) Appl. No.: 17/274,423

(22) PCT Filed: Sep. 6, 2019

(86) PCT No.: PCT/FR2019/052059
§ 371 (c)(1),
(2) Date: Mar. 8, 2021

(87) PCT Pub. No.: WO2020/049262
PCT Pub. Date: Mar. 12, 2020

(65) Prior Publication Data
US 2022/0049793 A1    Feb. 17, 2022

(30) Foreign Application Priority Data

Sep. 6, 2018 (FR) ..................................... 1857986

(51) Int. Cl.
*F16K 49/00* (2006.01)
*F02C 9/18* (2006.01)
*F28F 13/06* (2006.01)

(52) U.S. Cl.
CPC .............. *F16K 49/005* (2013.01); *F02C 9/18* (2013.01); *F28F 13/06* (2013.01); *F05D 2260/221* (2013.01); *F05D 2260/608* (2013.01)

(58) Field of Classification Search
CPC ...... F16K 49/00; F16K 49/005; F16K 49/007; F02C 9/18; F01D 17/148; F28F 13/06
(Continued)

(56) References Cited

U.S. PATENT DOCUMENTS 10,100,729 B2 * 10/2018 Simpson .................... F02C 6/08
10,830,372 B1 * 11/2020 DeFelice ............... F16K 11/056
(Continued)

*Primary Examiner* — Justin D Seabe
(74) *Attorney, Agent, or Firm* — CRGO Global; Steven M. Greenberg

(57) ABSTRACT

The invention relates to a device (30) for cooling heat-sensitive control members (29) of a pneumatic or electropneumatic valve (20), comprising a containment casing (31) designed to contain said control members (29): a fresh air inlet (32) in said containment casing (31); an air outlet (33) of said containment casing, provided with a ventilation air tube (34) that comprises: an air acceleration column (35) which puts into fluidic communication said containment casing (31) and the air outlet (33); a primary supply (37) for supplying the acceleration column (35) with primary air; a secondary supply (38) for supplying the acceleration column (35) with secondary air, provided in said containment casing (31) such that the primary air can drive and accelerate the secondary air in the direction of the air outlet so as to produce forced air ventilation in said containment casing (31) between the air inlet (32) and the air outlet (33).

7 Claims, 4 Drawing Sheets

Figure 1:
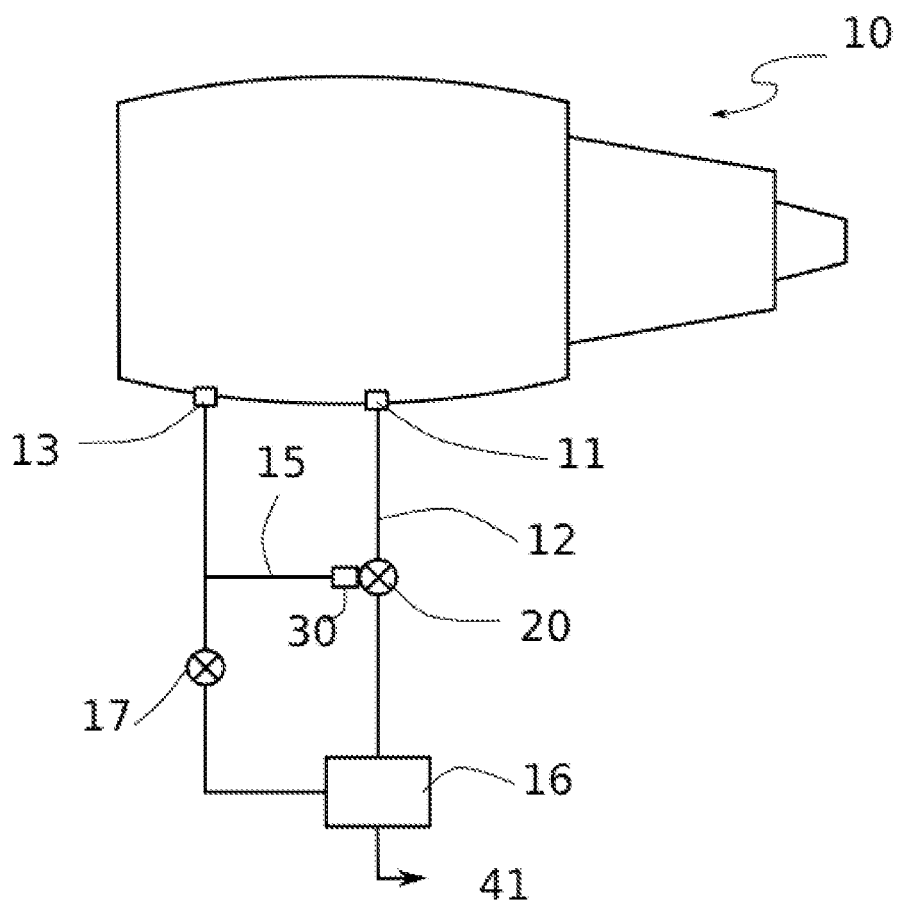

(58) Field of Classification Search
USPC .................................................. 137/339, 340
See application file for complete search history.

(56) References Cited

U.S. PATENT DOCUMENTS

| | | |
|---|---|---|
| 2013/0283815 A1 | 10/2013 | Simpson |
| 2014/0034146 A1 | 2/2014 | Rossi et al. |
| 2016/0208702 A1* | 7/2016 | Schroder ............... F16K 31/406 |
| 2017/0306846 A1 | 10/2017 | Laing |
| 2017/0335769 A1* | 11/2017 | Boujida .................... F02C 6/08 |

* cited by examiner

DEVICE FOR COOLING HEAT-SENSITIVE CONTROL MEMBERS OF A PNEUMATIC OR ELECTROPNEUMATIC VALVE, AND VALVE EQUIPPED WITH SUCH A COOLING DEVICE

CROSS-REFERENCE TO RELATED APPLICATIONS

This application is a § 371 national phase entry of International Application No. PCT/FR2019/052059, filed Sep. 6, 2019, which claims priority to French Patent Application No. 1857986, filed Sep. 6, 2018.

1. TECHNICAL FIELD OF THE INVENTION

The invention relates to a pneumatic or electro-pneumatic valve and a device for cooling control members of this valve. The invention relates more particularly to a valve intended to be arranged in a propulsion engine environment of an aircraft, such as a discharge valve of an air compressor or an air bleed valve.

2. TECHNOLOGICAL BACKGROUND

An air bleed valve on a propulsion engine of an aircraft makes it possible to bleed high-pressure air intended for example to supply an environmental control system of an aircraft cabin, better known by the acronym ECS.

Such a valve is generally arranged in the engine environment, i.e. in the engine nacelle or in the immediate vicinity of the engine, on the air bleed hoses.

This environment is subjected, during the flight of the aircraft, to high temperatures which may reach nearly 500° C.

It is therefore necessary to provide means for cooling the control members of these bleed valves. Indeed, it is common for the control members of these valves to be unable to withstand the high temperatures which prevail in the engine environment.

To overcome these problems, one of the solutions commonly implemented at present is to move the control members to an area of the aircraft where the temperatures are more favorable, for example in the pylon of the aircraft, outside of the nacelle. One of the drawbacks of this solution lies in the fact that it is necessary to run control lines between the control members and the valve. Moreover, this solution makes it necessary to find a location in a cold area of the aircraft and to provide means for anchoring these control members in this cold area.

Another known solution for compact valves which integrate their control members involves bleeding fresh air from the secondary flow of the engine, better known as fan air or "bypass air," produced by the fan of the engine, and projecting this bleed air onto the control members of the valve via a ventilation channel.

One of the drawbacks of this solution is that the air flow rate is limited and determined by the pressure differences at the ends of the ventilation channel.

The same problem also arises for discharge valves which allow the air to be discharged from the compression stage into the secondary flow of the engine. The temperature of the discharge air is high and sometimes incompatible with the electromechanical control members of this valve.

Also, it is known to move the control members into a cooler area of the aircraft, which generates the same drawbacks as the air bleed valves.

The inventors therefore sought to develop a new solution making it possible to cool the control members of a pneumatic or electro-pneumatic valve, such as a discharge valve or an air bleed valve, capable of being arranged in an environment subjected to temperatures above the nominal operating temperatures of the control members of this valve.

3. AIMS OF THE INVENTION

The invention therefore aims to provide a device for cooling heat-sensitive control members of a pneumatic or electro-pneumatic valve capable of being arranged in an environment subjected to temperatures above the nominal operating temperatures of these control members.

The invention aims in particular to provide, in at least one embodiment, such a device for conditioning the cooling of the control members to the activation of the associated valve.

The invention also aims to provide a valve equipped with such a device for cooling the control members thereof.

The invention aims in particular to provide a compact valve equipped with such a control device.

The invention also aims to provide, in at least one embodiment, a discharge valve of the HBV valve type (handling bleed valve).

The invention also aims to provide, in at least one embodiment, an air bleed valve of the HPV (high pressure valve) or the PRV (pressure regulating valve) type.

4. DISCLOSURE OF THE INVENTION

To do this, the invention relates to a device for cooling heat-sensitive control members of a pneumatic or electro-pneumatic valve capable of being arranged in an environment subjected to temperatures above the nominal operating temperatures of these control members.

The cooling device according to the invention comprises a containment casing adapted to contain said control members of said valve; an air inlet, called the fresh air inlet, in said containment casing; and an air outlet from said containment casing, which outlet is equipped with an air mover comprising:
  an air acceleration column placing said containment casing and said air outlet in fluid communication;
  a first supply, called the primary supply, of air, called primary air, having a temperature and pressure greater than the temperature and pressure of the fresh air, to the acceleration column,
  a second supply, called the secondary supply, of air, called secondary air, present in said containment casing, to said acceleration column,
so that said primary air may drive and accelerate the secondary air toward said air outlet so as to produce forced air ventilation in said containment casing between said air inlet and said air outlet.

A cooling device according to the invention therefore makes it possible to keep the heat-sensitive control members in a containment casing supplied with fresh air, and to force the ventilation of this fresh air in the containment casing by means of an air mover arranged at the outlet of the containment casing. This forced air mover is configured so that it may be supplied by a high-energy primary air flow, making it possible to drive a secondary air flow in said containment casing which is itself supplied with fresh air. In other words, the secondary air is the fresh air that supplies the casing. Also, forced ventilation makes it possible to force the intake of fresh air into the containment casing, its circulation in the containment casing, and its expulsion toward the air outlet.

Throughout the text, the term "control member" denotes a member which participates directly or indirectly in the operation of the valve. Such a member may be a control member as such (for example, an electric actuator, a solenoid valve, a servovalve, etc.), or a member for monitoring the correct operation of the valve (for example a pressure sensor, a position sensor, etc.), and in general any member that participates in the operation of the valve.

According to the invention, forced ventilation is generated by an air mover comprising an acceleration column, an air mover primary supplied with hot air (possibly under pressure), circulating for example in the body of the valve controlled by the control members, and a secondary supplied with cold air, which is for example the air circulating in a channel supplied by the fan of a propulsion engine of an aircraft. The primary air flow drives the secondary air flow, creating a forced ventilation effect. The temperature-sensitive members may thus be cooled by the air flow circulating in the containment casing between the air inlet and the air outlet.

Depending on the type of valve (discharge valve of a compression stage or air bleed valve) and depending on the arrangement of this valve in the aircraft, different embodiments are possible for supplying the air mover with primary air and secondary air.

A cooling device according to the invention therefore makes it possible to install a pneumatic or electro-pneumatic valve with its control members in a harsh temperature environment while ensuring nominal operation of the control members.

It therefore becomes possible with a cooling device according to the invention to eliminate the need to move the control members into the cold areas of the aircraft and to run control lines connecting these members and the valve thus controlled.

A device according to the invention therefore makes it possible to simplify the architectures of the valves, in particular the air discharge and bleed valves, and to limit the size of said valves.

Thus, and according to a variant of the invention, said primary supply is in fluid communication with an air chamber arranged downstream of a pneumatic regulator of said valve so as to be able to ensure forced ventilation which is not very sensitive to the operating conditions of said valve.

According to this advantageous variant of the invention, the forced air mover is supplied with primary air by means of air from an air chamber installed downstream of a pneumatic regulator of the valve. In other words, the primary air is tapped downstream from the pneumatic regulator of the valve, which makes it possible to give the air mover stable and nominal operating conditions whatever the flight conditions of the aircraft equipped with a valve provided with a cooling device according to this variant. In particular, the primary air flow rate may then be almost constant and thus ensure ventilation of the casing containing the heat-sensitive elements at an almost constant flow rate.

According to another variant of the invention, said primary supply is in fluid communication with a chamber arranged downstream of an activation member of said air valve, of the activation solenoid type, so that said forced ventilation provided by said air mover is only effective when said valve is activated by said activation member.

According to this advantageous variant, the air mover is only supplied with primary air when the valve is itself activated. This is made possible by supplying the acceleration column with air from an air chamber arranged downstream of a valve activation member, of the activation solenoid type. In other words, when the activation solenoid is not active, the chamber downstream of the solenoid is not supplied with air and therefore the injection tube is no longer supplied with primary air. The air mover therefore does not allow the secondary air to be accelerated in this configuration. The heat-sensitive elements then simply benefit from cooling by natural ventilation of the air circulating between the air inlet and the air outlet of the containment casing. On the other hand, when the activation solenoid is active, the air chamber downstream of the solenoid is supplied with primary air which in turn supplies the acceleration column, which makes it possible to trigger the forced ventilation.

In other words, this advantageous variant makes it possible to switch between natural ventilation when the valve is closed, i.e. in the absence of hot air circulation in the valve, and forced ventilation as soon as the valve is activated, which allows better cooling of the heat-sensitive elements housed in the containment casing, including the activation member, such as the solenoid, in an operating phase in which it is traversed by a current which generates heating by the Joule effect.

This advantageous embodiment therefore makes it possible to activate the air mover and therefore to force the ventilation only when the operation of the valve is required. This configuration makes it possible to limit the consumption of primary air. It is particularly advantageous when the ventilation contributes, for example, to limiting the self-heating of a solenoid.

A device for cooling a valve according to the invention preferably equips a valve intended to be arranged in an engine environment, such as a compressor air discharge valve or an air bleed valve intended to supply an air conditioning system of an aircraft cabin. However, there is nothing to prevent equipping a valve of an air system and, in general, any pneumatic or electro-pneumatic valve intended to be arranged in an environment subjected to severe temperatures that are not compatible with the nominal operating temperatures of the control elements of this valve.

The invention also relates to a pneumatic or electro-pneumatic valve comprising a valve body comprising an air inlet, an air outlet and an air circulation duct between the air inlet and the air outlet, a closure member movably mounted in said circulation duct between at least one open position in which the air may freely circulate from said inlet to said outlet, and a closed position in which the closure member prevents the passage of air from the inlet to said outlet, and control members of said closure member.

A valve according to the invention is characterized in that it further comprises a device for cooling said control members according to the invention, so that said valve may be arranged in an environment, such as an aircraft engine environment, likely to be subjected to temperatures above the nominal operating temperatures of said control members.

The advantages of a cooling device according to the invention apply mutatis mutandis to a pneumatic or electro-pneumatic valve according to the invention.

According to a variant of the invention, the primary supply of said acceleration column of said cooling device is connected to said valve body, upstream or downstream of said closure member, so that said primary air is the air circulating in said valve body.

According to another variant of the invention, the valve further comprises an integrated pneumatic regulating member and said primary supply of said acceleration column of said cooling device is connected downstream of said regulating member.

According to another variant of the invention, the valve comprises a valve activation member, of the activation solenoid type, and said primary supply of said acceleration column of said cooling device is connected downstream of said activation member so that said forced ventilation is effective only when said valve is activated by said activation member.

According to an advantageous variant of the invention, said air inlet in said containment casing of said cooling device is connected to an air duct supplied with air from a fan of a propulsion engine of an aircraft.

According to another advantageous variant of the invention, said secondary supply of said cooling device is connected to an air duct supplied with air from a compressor of a propulsion engine of an aircraft.

Advantageously and according to the invention, said control members comprise members of organic origin such as coatings, varnishes, membranes and in general any member capable of exhibiting thermal performance which deteriorates over time.

The invention also relates to a cooling device and a valve equipped with such a cooling device, characterized in combination by all or part of the features mentioned hereinbefore or hereinafter.

5. LIST OF FIGURES

Figure 2:
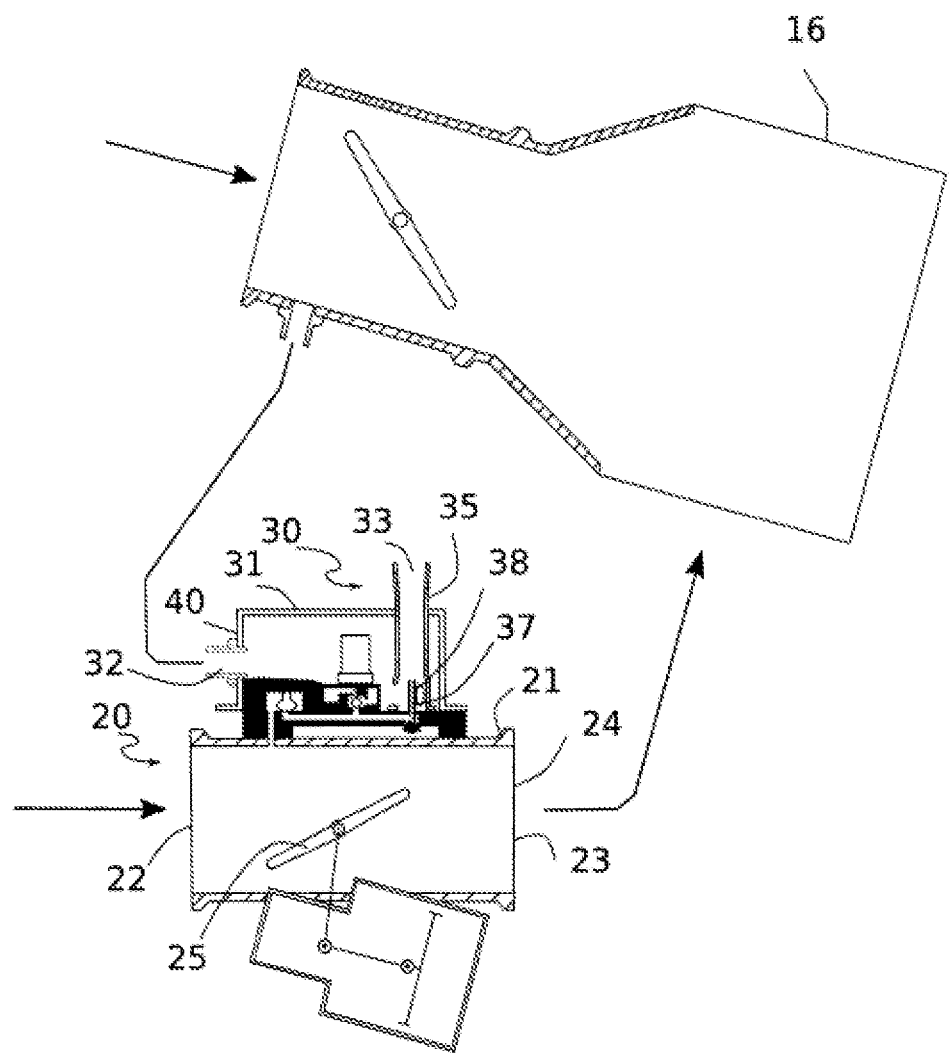
Figure 3:
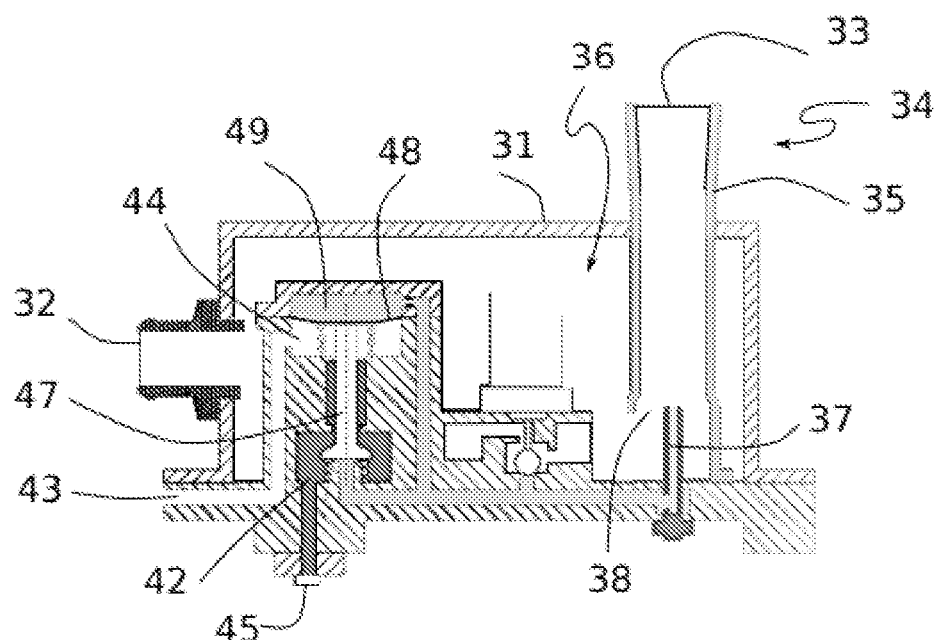
Figure 4:
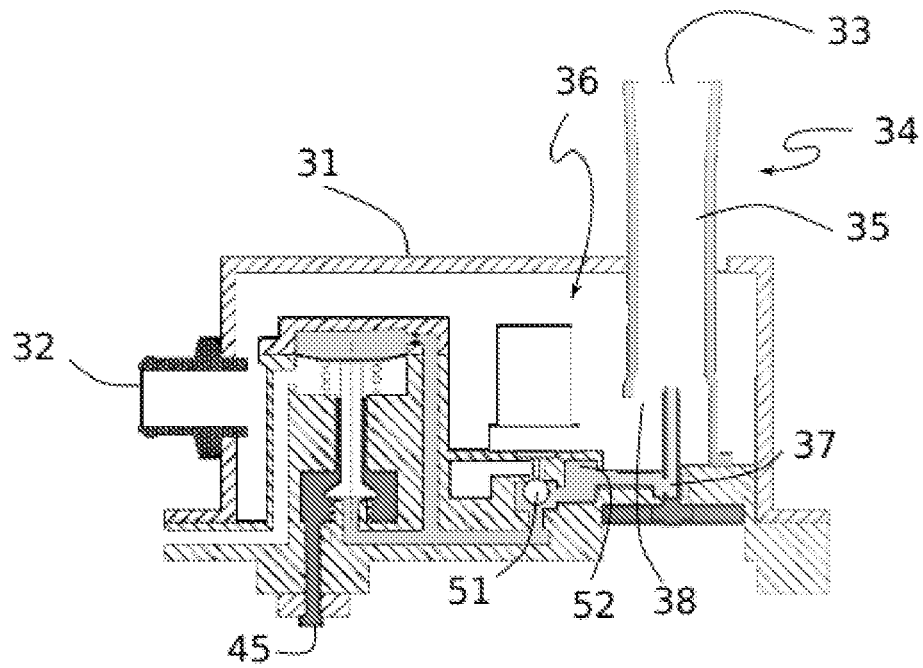
Figure 5:
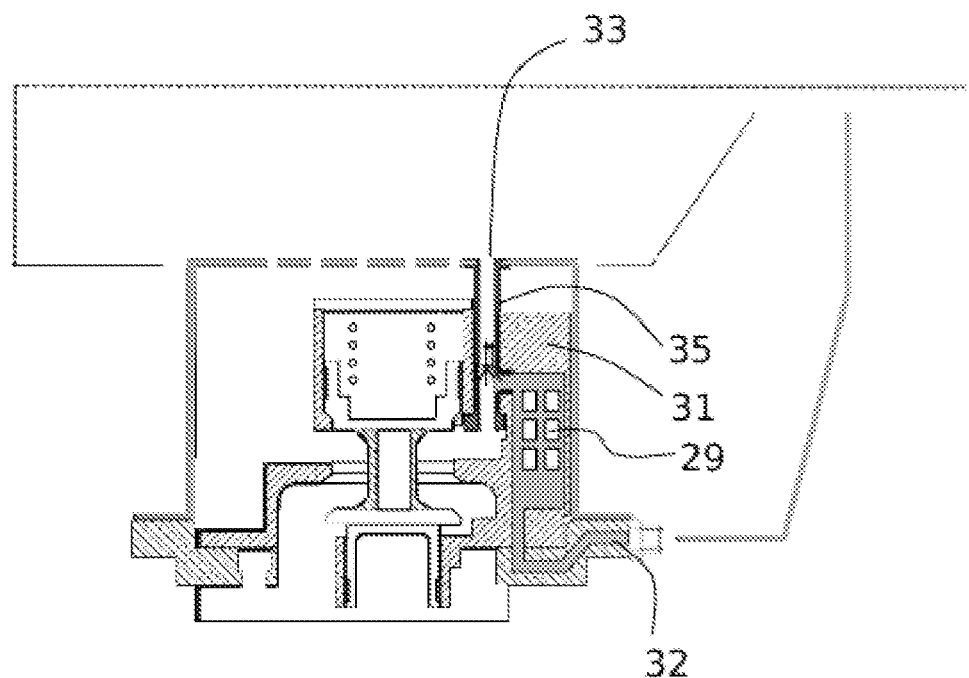

Further objectives, features and advantages of the invention will become apparent upon reading the following description, which is provided solely by way of non-limiting example, and which refers to the appended drawings, in which:

FIG. 1 is a functional schematic view of a valve according to an embodiment of the invention equipped with a cooling device according to an embodiment of the invention and installed within an air bleed system on a propulsion engine of an aircraft, FIG. 2 is a functional schematic view of a valve according to an embodiment of the invention equipped with a cooling device according to an embodiment of the invention, FIG. 3 is a detailed functional schematic view of the cooling device of FIG. 2, FIG. 4 is a detailed functional schematic view of a cooling device according to another embodiment, FIG. 5 is a functional schematic view of a valve according to another embodiment equipped with a cooling device according to another embodiment of the invention.

6. DETAILED DESCRIPTION OF ONE EMBODIMENT OF THE INVENTION

For the sake of illustration and clarity, scales and proportions are not strictly adhered to in the figures. Throughout the detailed description which follows with reference to the figures, unless otherwise indicated, each element of the cooling device is described as it is arranged when it equips a valve according to an embodiment of the invention.

Moreover, identical, similar or analogous elements are denoted using the same reference signs throughout the figures.

FIG. 1 schematically illustrates an air bleed system intended to supply an air conditioning pack for a cabin of an aircraft and comprising a valve according to one embodiment of the invention.

The system of FIG. 1 comprises a propulsion engine 10 of an aircraft comprising an air bleed port 11 connected by a duct 12 to an air bleed valve 20 according to an embodiment of the invention, which is better known by the acronym PRV (pressure regulating valve), itself connected to a heat exchanger 16, better known as a precooler. The air bleed valve 20 is equipped with a device 30 for cooling the control members according to one embodiment of the invention of the air bleed valve 20. The air bleed system also comprises an air bleed port 13 on the secondary flow of the engine 10, which flow is better known as fan air. This fan air circulates to the precooler 16 via a valve 17, better known by the acronym FAV (fan air valve), in order to cool the flow of hot air taken from the port 11. The air flow exiting the precooler 16 is then directed to an air conditioning system 40 of a cabin of the aircraft. The cooling device 30 is supplied with fan air via a duct 15. As described in connection with FIGS. 2 to 5, this fan air is then accelerated by an air mover, not shown in FIG. 1, to allow the cooling of the control members of the valve 20.

FIG. 2 illustrates in a little more detail the valve 20 equipped with the cooling device 30.

The valve 20 comprises a valve body 21 comprising an air inlet 22, an air outlet 23, an air circulation duct 24 between the air inlet and the air outlet, and a butterfly valve 25 forming a closure member movably mounted in the circulation duct to allow or not allow the passage of air from the air inlet 22 to the air outlet 23.

This valve 20 is equipped with a cooling device 30 for control members of the valve.

This device comprises a containment casing 31 adapted to contain the control members of the valve 20. This casing 31 may be made of any type of material compatible with the environment in which it is intended to be installed, in particular in an engine environment.

This casing 31 defines an enclosure 36 supplied with air by a fresh air inlet 32. The casing also includes an air outlet 33 equipped with an air mover 34.

This air mover 34 comprises an air acceleration column 35 placing the enclosure 36, delimited by the casing 31, and the air outlet 33 in fluid communication.

The air mover 34 is supplied with air from both a primary supply 37 in fluid communication with a source of hot air and from a secondary supply 38 in fluid communication with the enclosure 36 delimited by the casing 31.

The secondary air present in the casing 31 is the fresh air introduced into the casing, possibly reheated in contact with the control members.

The architecture of the device is such that the primary air is hotter than the secondary air.

Moreover, the primary air may drive and accelerate the secondary air toward the air outlet 33 so as to produce forced air ventilation in the containment casing 31 between the air inlet 32 and the air outlet 33.

According to the embodiment of FIG. 2, the source of fresh air supplying the air inlet 32 is the fan air taken from the secondary flow of the engine 10.

According to the embodiment of FIG. 2, the source of hot air supplying the forced air mover 34 is air tapped at an air chamber downstream of the valve regulator 40.

FIG. 3 illustrates this air tapping downstream from the regulator 40 of the valve 20 in more detail.

The regulator 40 comprises, by way of example and as shown in FIG. 3, an inlet 41 for high-pressure air which is the hot air circulating downstream of the closure member 25 of the valve and which supplies a first chamber 42 of the regulator. The regulator also comprises an inlet 43 for a control fluid supplying a second pressure chamber 44. In addition, the regulator comprises a member 47 movable as a result of the pressure of the hot air and of the control fluid. This control member 47 is configured to be able to act on a membrane 48 which delimits a pressure chamber 49 connected to the primary supply 37 of the air mover 34.

The experiments carried out by the inventors demonstrate that, for an air mover equipped with a 2 mm injector, supplied by secondary air taking in fan air and implemented downstream of a regulator calibrated at 49 psig, the ventilation gains are between 4 and 38% relative to natural ventilation (estimated from a 0 mm injector).

According to another embodiment as shown in FIG. 4, the primary supply 37 of the air mover 34 is connected to a chamber 52 downstream of a control solenoid 51. Thus, the air mover 34 is supplied with primary air only when the valve is active.

FIG. 5 illustrates a valve according to another embodiment in the form of an air compressor discharge valve.

This valve comprises control members 29 housed in the casing 31. The casing 31 is supplied with fresh air taken from the secondary flow. The air outlet 33 of the casing opens into the secondary flow. The primary air supply to the acceleration column 35 is connected directly to a chamber downstream of the closure member of the valve. Thus, the supply is only effective when the discharge valve is open and supplied by the hot air from the compressor.

In other words, in the case of the engine discharge valve illustrated in FIG. 5, the cold air is supplied by the Venturi effect by using, on the primary circuit of the air mover, the pressure discharged by the valve in the open position, and, on the secondary circuit, the cold air taken from the secondary flow. This therefore makes it possible to force the ventilation when the calorie supply is greatest, i.e. when the valve is open.

In FIG. 5, the supply of the actuator chamber of the discharge valve is not shown in the interest of clarity.

If the control member is positioned outside the discharge duct of the valve, dedicated ventilation is obtained which is only active when the valve is opened.

If the control member is positioned inside the discharge duct of the valve, the situation is similar but with the addition of recirculation of air in the secondary flow. Furthermore, the internal location in the discharge duct makes it possible to optionally benefit from natural ventilation (at a lower flow rate than when the air mover is activated) if the ventilation tapping in the secondary flow makes it possible to recover the dynamic pressure.

Another variant consists in having permanent forced ventilation by supplying the primary of the air mover regardless of the state of the discharge valve. This then involves a permanent bleed from the compression stage.

The implementation of an air mover supplied in secondary by the air of the secondary flow therefore allows integrated ventilation of the sensitive components on board the discharge valve.

The experiments carried out by the inventors have made it possible to demonstrate that for a primary air pressure of approximately 20 bar, a secondary air pressure of approximately 1.5 bar, and an injector of 1 mm, the gains in ventilation of a device according to the invention are approximately 6 g/s of fresh air in a 5 mm duct.

The invention is mainly intended to cool heat-sensitive elements associated with a pneumatic or electro-pneumatic valve intended to be installed in an engine environment. However, a device according to the invention could also be used as a moderate heating means by mixing the very hot primary flow and the cold secondary flow implemented in a device according to the invention.

The invention claimed is:

1. A pneumatic or electro-pneumatic valve comprising: a valve body comprising an air inlet, an air outlet and an air circulation duct between the air inlet and the air outlet, a closure member movably mounted in said circulation duct between at least one open position in which air may freely circulate from said inlet to said outlet, and a closed position in which the closure member prevents the passage of air from the inlet to said outlet, and control members of said closure member, wherein the valve further comprises a device for cooling said control members so that said valve may be arranged in an environment capable of being subjected to temperatures above the nominal operating temperatures of said control members, the device comprising:
   a containment casing adapted to contain said control members of said pneumatic valve,
   a fresh air inlet in said containment casing,
   an air outlet of said containment casing, which outlet is equipped with an air mover comprising:
   an air acceleration column placing said containment casing and said air outlet in fluid communication;
   a primary supply, of primary air having a temperature and pressure greater than the temperature and pressure of the fresh air, to the acceleration column,
   a secondary supply of secondary air, present in said containment casing, to said acceleration column,
   such that said primary air drives and accelerates the secondary air toward said air outlet so as to produce forced ventilation of air in said containment casing between said air inlet and said air outlet.

2. The valve according to claim 1, wherein said primary supply of said acceleration column of said cooling device is connected to said air circulation duct of the valve, upstream or downstream of said closure member, so that said primary air is the air circulating in said valve body.

3. The valve according to claim 1, wherein the valve further comprises an integrated pneumatic regulating member and said primary supply of said acceleration column of said cooling device (30) is connected downstream of said regulating member.

4. The valve according to claim 1, wherein the valve comprises a member for activating the valve, of the activation solenoid type, and said primary supply of said acceleration column of said cooling device is connected downstream of said activation member so that said forced ventilation is only effective when said valve is activated by said activation member.

5. The valve according to claim 2 wherein said air inlet in said containment casing of said cooling device is connected to an air duct supplied with air from a fan of a propulsion engine of an aircraft.

6. The valve according to claim 2 wherein said secondary supply of said cooling device is connected to an air duct supplied with air from a compressor of a propulsion engine of an aircraft.

7. The valve according to claim 2 wherein said control members comprise members of organic origin having thermal performance that deteriorates over time.

* * * * *